(12) United States Patent
Iijima (10) Patent No.: US 11,098,823 B2
(45) Date of Patent: Aug. 24, 2021

(54) VACUUM BELLOWS HOT VALVE

(71) Applicant: Kitz SCT Corporation, Tokyo (JP)

(72) Inventor: Kazuo Iijima, Ohta (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 16/810,181

(22) Filed: Mar. 5, 2020

(65) Prior Publication Data

US 2020/0300384 A1   Sep. 24, 2020

(30) Foreign Application Priority Data

Mar. 19, 2019   (JP) .............................. JP2019-051566

(51) Int. Cl.
| | | |
|---|---|---|
| *F16K 49/00* | (2006.01) | |
| *F16K 41/10* | (2006.01) | |
| *F16K 51/02* | (2006.01) | |

(52) U.S. Cl.
CPC .............. *F16K 51/02* (2013.01); *F16K 41/10* (2013.01); *F16K 49/002* (2013.01); *Y10T 137/6606* (2015.04)

(58) Field of Classification Search
CPC ........ F16K 51/02; F16K 41/10; F16K 49/002; Y10T 137/6606
See application file for complete search history.

(56) References Cited

U.S. PATENT DOCUMENTS

| | | | | |
|---|---|---|---|---|
| 4,219,725 | A * | 8/1980 | Groninger | F17C 7/04 128/203.27 |
| 5,671,903 | A * | 9/1997 | Homma | F16K 31/003 251/69 |
| 5,678,595 | A * | 10/1997 | Iwabuchi | F16K 31/1221 137/341 |
| 5,915,410 | A * | 6/1999 | Zajac | F16K 1/54 137/341 |
| 5,915,626 | A * | 6/1999 | Awarzamani | F02M 51/0614 239/135 |
| 6,102,303 | A * | 8/2000 | Bright | F02M 51/005 137/341 |

(Continued)

FOREIGN PATENT DOCUMENTS

| | | |
|---|---|---|
| JP | 2995450 | 12/1999 |
| JP | 3778866 | 5/2006 |
| JP | 4401514 | 1/2010 |

*Primary Examiner* — David Colon-Morales
(74) *Attorney, Agent, or Firm* — Wenderoth, Lind & Ponack, L.L.P.

(57) ABSTRACT

A vacuum bellows hot valve with durability and drivability not impaired by increased temperature and voltage of a heating device while having a simple, compact structure, the valve also allowing temperature control with high accuracy. In the vacuum bellows hot valve, a stem is provided inside a valve box with an inflow port and an outflow port so as to freely ascend and descend, a bellows is elastically provided to a valve body provided at a lower end of the stem and on an outer circumferential side of the stem, a cylindrical ceramic heater is arranged between an inner circumference of the bellows and an outer circumference of the stem, and a temperature measuring part of a thermocouple for control is arranged at a position close to the valve body.

8 Claims, 4 Drawing Sheets

(56) References Cited

U.S. PATENT DOCUMENTS

| | | | | |
|---|---|---|---|---|
| 6,227,236 B1* | 5/2001 | Kusumoto | F16K 31/047 | 118/620 |
| 6,321,780 B1* | 11/2001 | Iwabuchi | F16K 31/04 | 137/341 |
| 6,478,043 B2* | 11/2002 | Ishigaki | F16K 41/10 | 137/341 |
| 6,561,168 B2* | 5/2003 | Hokao | F02M 51/0682 | 123/41.31 |
| 6,572,075 B2* | 6/2003 | Iwabuchi | F16K 31/047 | 251/129.03 |
| 6,668,854 B2* | 12/2003 | Fukuda | F16K 49/002 | 137/338 |
| 6,708,721 B2* | 3/2004 | Fukuda | F16K 49/002 | 137/338 |
| 6,748,969 B2* | 6/2004 | Kanzaka | F16K 49/002 | 137/338 |
| 6,805,152 B2* | 10/2004 | Kanzaka | F16K 31/122 | 137/338 |
| 7,401,760 B2* | 7/2008 | Kanzaka | F16K 51/02 | 251/63 |
| 7,546,848 B2* | 6/2009 | Koenekamp | F16K 49/002 | 137/341 |
| 7,841,578 B2* | 11/2010 | Ishigaki | F16K 27/102 | 251/63.6 |
| 7,849,873 B2* | 12/2010 | Hiratsuka | F16K 49/00 | 137/341 |
| 8,443,830 B2* | 5/2013 | Tanikawa | F16K 49/002 | 137/341 |
| 8,534,311 B2* | 9/2013 | Ishigaki | F16K 49/002 | 137/341 |
| 8,714,523 B2* | 5/2014 | Lee | F16K 41/10 | 251/335.3 |
| 9,851,012 B2* | 12/2017 | Kienreich | F16K 1/42 | |
| 10,260,655 B2* | 4/2019 | Kim | F16K 31/1221 | |
| 10,260,656 B2* | 4/2019 | Ito | G05D 16/2093 | |
| 2007/0072029 A1* | 3/2007 | Masunishi | H01M 8/04007 | 429/423 |
| 2007/0110415 A1* | 5/2007 | Tanikawa | F16K 27/12 | 392/498 |

* cited by examiner

VACUUM BELLOWS HOT VALVE

BACKGROUND OF THE INVENTION

Field of the Invention

The present invention relates to vacuum bellows hot valves and, in particular, a vacuum bellows hot valve excellent in durability, drivability, and electrical safety such as withstand voltage even under high temperature and high voltage (for example, specifications for 200 V and a withstand voltage of 1500 V).

Description of the Related Art

Conventionally, in an evacuation system and so forth of semiconductor manufacturing apparatuses' (such as film-formation apparatus and etching apparatuses), in the case of high-temperature reaction gas, high-temperature fluid having a low boiling point, or the like used in a chemical process inside a chamber, byproducts are gradually deposited and attached inside a flow path with a decrease in fluid temperature unless exhaust is appropriately kept in a high-temperature state. This may impair normal functions such as driving and seating the valve body particularly in a valve for opening and closing or pressure control disposed in the course of flow-path plumbing. To address this problem, for a valve provided in the course of the fluid as described above, a so-called hot valve is used, which includes appropriate heating/temperature-control means to allow the entire valve to be kept in an appropriate high-temperature state. Also, for a hot valve of this type, a so-called bellows-type valve is often used, in which the stem driving the valve body is hermetically sealed off and separated by a bellows from the flow path.

Conventionally, as vacuum bellows hot valves as described above, valves disclosed in Japanese Patent Nos. 2995450, 4401514, and 3778866 have been suggested. Disclosed in Japanese Patent No. 2995450 is a vacuum exhaust valve in a CVD apparatus. To heat the valve body, a helical sheath heater is wired in the bellows concentrically with the stein. Also inside this sheath heater, a helical sheath thermocouple is wired to measure the temperature of the valve body. Electric wires of the heater and the thermocouple are provided in a double helical manner. By this helical sheath heater that can follow the ascent and descent of the valve body, at least the stem, the valve body, and the bellows are each heated.

Disclosed in Japanese Patent No. 4401514 is a plane heater configured with a heater wire uniformly buried inside an insulator made of silicon rubber. This plane heater has a flexible sheet shape, and is attached so as to be wound around the outer circumference of a cylindrical heater sleeve to cover the heater sleeve. Inside this heater sleeve, the stem is concentrically inserted so as to be able to ascend and descend. Also, a flange part of the heater sleeve is screwed and fixed to a heat insulator on an upper part of the body. This allows the stem and the bellows to be heated, while the plane heater is fixed inside the bellows in a non-movable manner. Furthermore, a covered thermocouple having a temperature-measurement contact part for temperature detection is provided at a substantially center position of the plane heater. As another example of the plane heater, one with a heater wire buried in an insulator made of glass wool is also mentioned.

Also disclosed in Japanese Patent No. 3778866 is an aluminum-made member as a member for fixing a heater inside the bellows in a non-movable state, the member formed of a flange part fixed to a body side and a cylindrical part inside of which the stem is concentrically inserted so as to be able to ascend and descend. Into this member, a rod-shaped heater of an electrical-resistance heating type is inserted toward the axial direction. With this member as a heat transfer member, the valve is configured so that it can be heated. A heater and a temperature sensor are provided also to the valve body. Electric wires for bringing these heater and temperature sensor in electric conduction to a power source outside the valve are concentrically inserted, as a primary lead wire bundle, inside a stem formed to have a hollow shape and are drawn out to a piston upper surface side provided on an upper part of the stem. On this piston upper surface side, electric wires are wired as a helical secondary lead wire bundle so as to be able to follow the ascent and descent of the stem.

However, in Japanese Patent No. 2995450, as for at least the helical electric wire for heating the sheath heater, to support heating temperatures higher than ever, for example, 180 degrees Celsius or higher (use temperature range: 20 degrees Celsius to 300 degrees Celsius), it is difficult to avoid thickening the diameter of the electric wire to increase heating outputs, if a wire provided inside the bellows so as to follow the ascent and descent of the valve body is thickened, favorable flexibility of the wire is lost, and it thus becomes difficult to helically wind the wire, thereby possibly affecting valve handling, such as assembling, disassembling, and maintenance. Moreover, by thickening the wire, the resistive force for contracting the wire with the ascent and descent of the valve body increases, and the total weight of wires inside the bellows also increases, thereby also possibly affecting drivability of the valve body. Therefore, it is difficult for the technique disclosed in Japanese Patent No. 2995450 to sufficiently support thickening of wires for the heaters.

In Japanese Patent No. 4401514, since the silicon rubber heater or the glass wool heater is used, the heat-resistant temperature of the heater is low. Thus, as with the above-described case, in a high-temperature range higher than ever, for example, 180 degrees Celsius (the valve use temperature constantly extends a temperature range equal to or higher than 300 degrees Celsius), sufficient durability and stable usability may not be achievable. Moreover, the thermocouple for measuring the temperature of the inside of the valve is not provided to the valve body itself, but is provided at a position slightly away from the valve body. Thus, accuracy of measuring the temperature of the valve body portion is not high. In the hot valve, portions where deposition and attachment of byproducts matter most are those of the valve body and the valve seat which directly influence valve's sealability. By detecting and controlling temperatures near the valve body with high accuracy, the normal functions of the hot valve can be appropriately kept. Among others, this is important in the high-temperature range. Therefore, in the valve disclosed in Japanese Patent No. 4401514, it may be difficult to adjust the temperature inside the valve with sufficient accuracy, particularly in the high-temperature range.

Also in Japanese Patent No. 3778866, since a general electrical resistance heater is merely used, it is difficult to achieve sufficient heat resistance in a high-temperature range. Moreover, as evident from the drawings in Japanese Patent No. 3778866, the valve structure is disadvantageously complicated too much. That is, while the valve body is provided with the heater and the temperature sensor, as a structure for bringing the wire bundles of these in electric conduction to the outside of the valve, it is dispensable, according to Japanese Patent No. 3778866, to provide at least a hollow stem, a terminal block attached to the piston, a secondary electric wire bundle having a spiral part which extends and contracts inside the actuator, a connector for guiding this electric wire to the outside of the actuator, and so forth. To form this structure, the structures of the valve and the actuator have to be considerably complicated, thereby affecting the use of the valve, such as increasing production cost and taking much time and effort in maintenance. In particular, the hollow stem requires high production cost and low maintenability, and also often has a problem in mechanical strength. Thus, the valve disclosed in Japanese Patent No. 3778866 is difficult to, support at least an increase in temperature, and also has problems such as complication in valve structure and low durability.

BRIEF SUMMARY OF THE INVENTION

The present invention has been developed to solve the above-described problems, and is to provide a vacuum bellows hot valve with durability and drivability not impaired by increased temperature and voltage of heating means while having a simple, compact structure, the valve also allowing valve's temperature control with high accuracy.

A first aspect of the present invention is directed to a vacuum bellows hot valve in which a stem is provided inside a valve box with a inflow port and an outflow port so as to freely ascend and descend, a bellows is elastically provided to a valve body provided at a lower end of the stem and on an outer circumferential side of the stem, a cylindrical ceramic heater is arranged between an inner circumference of the bellows and an outer circumference of the stem, and a temperature measuring part of a thermocouple for control is arranged at a position close to the valve body.

A second aspect of the present invention is the vacuum bellows hot valve in which the ceramic heater is configured by attaching a plate-shaped ceramic heater material on a side surface of a metal-made tubular member with high thermal conductivity having a flange part.

A third aspect of the present invention is directed to the vacuum bellows hot valve in which the ceramic heater material is configured to have a ceramic-made heating element having a substantially flattened rectangular parallelepiped shape to which a voltage can be applied by paired electrodes.

A fourth aspect of the present invention is directed to the vacuum bellows hot valve in which the tubular member is formed of aluminum, a flat attachment part is formed on one side surface of the tubular member, and the ceramic heater material is attached to the flat attachment part via an attachment member.

A fifth aspect of the present invention is directed to the vacuum bellows hot valve in which the temperature measuring part is fixed to a back surface part of the valve body, and a sheath thermocouple connected to the temperature measuring part is helically arranged between an outer circumference of the ceramic heater and an inner circumference of the bellows.

According to the first aspect of the present invention, since the ceramic heater is used. Thus, compared with the conventional heater made of silicon rubber and the conventional mantle heater made of glass wool, the heating temperature is substantially high, and high heat resistance can be achieved, and thus the heating use temperature can be significantly increased. Also, since this ceramic heater is arranged and fixed inside the valve box. Thus, compared with the case in which the heater is provided to the valve body, the structure of the valve body can be simplified, the weight of the valve body is not increased, and favorable drivability can be ensured. Furthermore, wires for the heater does not have to follow driving of the valve body. Thus, even if the wires are thickened for high outputs, problems in winding these wires in a coil shape and making these wires expand and contract do not occur. Also, electrical safety against damages on electric wires and electric leakage is excellent.

Furthermore, the temperature measuring part of the thermocouple for control is arranged at a position close to the valve body. Thus, it is possible to enhance accuracy of measuring the temperature of portions near the valve body, which is very important in detecting valve's seal performance, and also the temperature of portions near the valve seat. This allows valve management and control with high accuracy in accordance with, implementation.

Still further, in the bellows valve, while the bellows and the valve body are symmetrically provided with the stem taken as an axial position, the cylindrical ceramic heater is arranged as a heating source between the inner circumference of the bellows and the outer circumference of the stem. Thus, as for heat transfer from this heating source, heat can be diffused by taking the heater as the center in a substantially symmetrical manner. Therefore, a large imbalance is not caused in heating temperatures of the stem, the bellows, and so forth, the occurrence of byproducts can be reliably prevented, and heating efficiency is favorable.

According to the second aspect of the present invention, the ceramic heater is configured by attaching a plate-shaped ceramic heater material on a side surface of a metal-made tubular member with high thermal conductivity having a flange part. Thus, only by attaching the heater material to a part of the heater for heating, with sufficiently high heating power of the ceramic heater material compared with required temperature, the entire tubular member can be substantially uniformly heated with ease.

According to the third aspect of the present invention, the ceramic-made heating element having a substantially flattened rectangular parallelepiped shape is configured so that a voltage can be applied to the heating element by paired electrodes. Thus, the ceramic heater can be configured with the simplest structure.

According to the fourth aspect of the present invention, the tubular member is formed of aluminum, and the ceramic heater material is attached to the flat attachment part formed on one side surface of the tubular member. Thus, heat from the heater material can be efficiently transmitted to the tubular member without waste. Also, with the heater material only adhered to the flat attachment part via the attachment member, the structure of the heating source can be very simplified, while high thermal conductivity efficiency is ensured.

According to the fifth aspect of the present invention, the sheath thermocouple (sheath part) is helically arranged between the outer circumference of the ceramic heater and the inner circumference of the bellows. Thus, while the sheath part of the thermocouple in electric conduction from the outside of the valve to the valve body is accommodated in the bellows in a compact manner without hindering valve's drivability and usability, the lead wire of the thermocouple has nothing to do with thickening wires to increase temperature, and thus problems in winding the thickened wires in a coil shape and making these wires expand and contract do not occur.

Furthermore, since the sheath thermocouple is used, the present invention is excellent in response, as well, as mechanical strength and flexibility. Also, a wide temperature measurement range can be set. In particular, since the temperature measuring part of the sheath thermocouple is fixed to the back surface of the valve body, the temperature of the valve body portion can be measured with high accuracy.

DETAILED DESCRIPTION OF THE INVENTION

Figure 1:
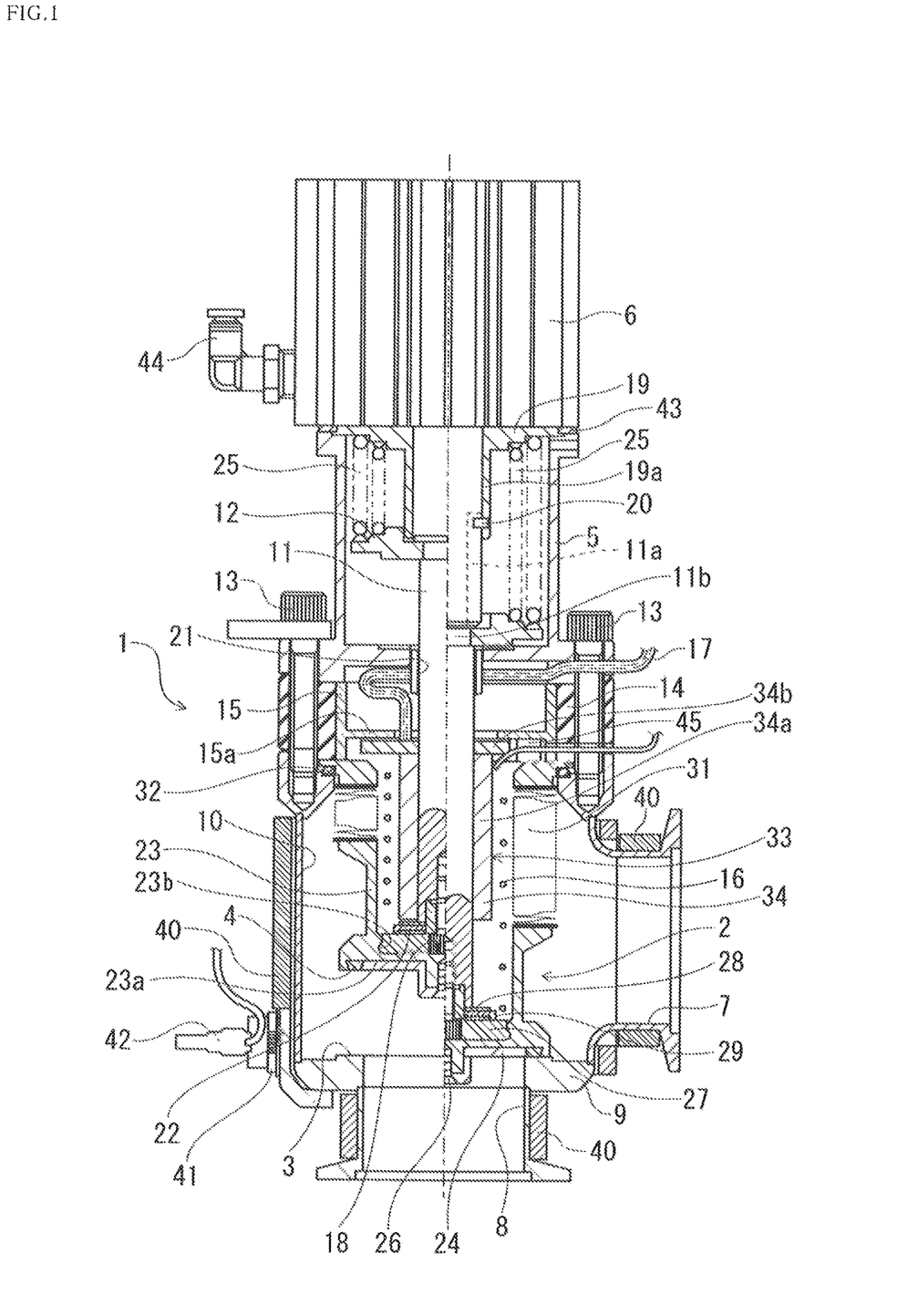
FIG. 1 is a partial sectional view depicting a cross section of a valve main body in a valve of an example of the present invention, in which a left side depicts a full-open state and a right side depicts a full-close state.

In the following, an embodiment (example) of the present invention is described in detail with reference to the drawings. FIG. 1 depicts a cross section of a valve main body 1 and an actuator 6 mounted thereon via a bonnet 5, in a valve of the example. Depicted on a left side of a one-dot-chain line in FIG. 1 is a full-open state in which a valve body 2 is at a full-open position. Depicted on a right side of the one-dot-chain line in FIG. 1 is a full-close state in which a seal member 4 of the valve body 2 is seated on a valve seat 3.

A valve box 9 is integrally formed of a metal-made member or is configured by welding a plurality of metal-made members, and has an inflow port 7 and an outflow port 8. The valve of the example is used to open and close evacuation containing process gas flown out from a vacuum chamber of a semiconductor manufacturing apparatus and/or control pressure. Inside the valve box 9, a valve chamber 10 is provided. The inflow port 7 opens from a direction crossing an ascending/descending direction of a stem 11 toward the inside of the valve chamber 10, and the outflow port 8 opens at the bottom inside the valve chamber 10 from a direction crossing the inflow port 7. On the outer circumference of the outflow port 8, the valve seat 3 is formed where the seal member 4, which will be described further below, is seated. The inflow port 7 and the outflow port 8 may be used so that inflow and outflow are reversed.

The valve seat 3 is an annular metal flat surface formed integrally with the valve box 9. Other than this structure, although not depicted, an annular valve seat member separate from the valve box 9 may be provided at a seating position or the seal member 4, which will be described further below, provided to the valve body 2 may be provided to a valve seat side (valve box side). The seal surface of the valve seat 3 may be formed not in a flat shape but may be formed as a convex surface or a curved surface. In this manner, the valve seat structure is not particularly limited and can be configured as appropriate in accordance with implementation.

The bonnet 5 has a substantially cylindrical shape having flange-shaped portions at upper and lower ends in FIG. 1, and is integrally formed of a metal-made member. The lower end of the bonnet 5 is tightly attached and fixed to an upper portion of the valve box 9 with hexagon-socket bolts 13 via a heat insulating material 14 between the bonnet 5 and an upper portion of the valve box 9. Inside the bonnet 5, a spring 25 is provided to spring back a piston 12 fixed to the stem 11, which will be described further below.

In the example, the spring 25 is a normal close type in which SWPB coil springs are doubly provided, one having a large diameter and the other one having a mall diameter, on an upper surface side of the piston 12 to press the piston 12 downward. Other than this structure, the spring 25 may be provided as a normal open type of being provided on the lower side of the piston 12. Alternatively, another spring-back member other than a coil spring may be provided, or a spring-back structure by a spring may be omitted. In this manner, any structure of the bonnet 5 can be selected as appropriate in accordance with implementation.

In the example, a heat insulator 14 is a heat insulating material fabricated by compounding predetermined organic and inorganic materials. The heat insulator 14 preferably has characteristics including excellent chemical resistance and high heat insulating effects, as well as high strength characteristics, such as high flexural and compression strength. The heat insulator 14 is provided so as to have a substantially rectangular cross section and a substantially ring shape to insulate heat between the lower end of the bonnet 5 and an upper part of the valve box 9. A pipe flange 15 fits in an inner-diameter side of the heat insulator 14.

The pipe flange 15 is a substantially-cylindrical hollow member integrally formed of metal. In FIG. 1, on a lower side, the pipe flange 15 has a bottom plate part 15a with a hole part at a center position where the stem 11 can be inserted. Although not depicted, the pipe flange 15 is fixed to the inside of the valve main body 1 as having a bolt inserted from the bottom plate part 15a toward the lower end of the bonnet 5. The pipe flange 15 has roles as, a support member which stably and firmly retains a tubular member 34, which will be described further below, inside the bellows 31, as a spacer for ensuring a space which lets a sheath part 16 and heater electric wires 17 drawn out appropriately front the inside of the bellows 31 to the outside of the valve main body 1, and so forth, and is interposed between the upper part of the valve box 9 and a lower part of the bonnet 5.

Furthermore, in the example, another heat-insulating member 43 formed of the same material as that of the heat insulator 14 is interposed between the upper end of the bonnet 5 and the outer circumference of the lower surface of the actuator 6. The heat-insulating member 43 is formed to have a thin ring shape and is tightly pressurized vertically, insulating heat conduction doubly together with the heat insulator 14, from a valve main body 1 side to an actuator 6 side.

In FIG. 1, the actuator 6 is fixed with bolts to the upper end of the bonnet 5 to be mounted on the valve main body 1. The actuator 6 of the example is an air operate type via a one-touch coupling 44, causing a piston to ascend and descend by supplying and discharging air between an air chamber not depicted inside the actuator and an external air source. However, the actuator 6 may be of a driving scheme other than air driving as described above, and any driving scheme can be selected as appropriated in accordance with implementation. In the example, as will be described further below, the actuator 6 is used to cause the stem 11 to ascend and descend. Furthermore, no actuator may be provided and the stem 11 may be configured to be drivable manually.

The stem 11 has a long, substantially columnar shape integrally formed of metal. In FIG. 1, while the lower end of the stem 11 has the valve body 2 fixed with a hexagon-socket bolt 18, the upper end thereof is coupled so as to freely ascend and descend inside the actuator 6 by a driving mechanism formed of the piston by air driving not depicted. The upper part of the stem 11 is inserted into a cylindrical part 19a vertically provided from a base 19 provided the bottom part of the actuator 6 so as to loosely fit therein. The cylindrical part 19a is provided with a stopper 20 provided to protrude toward an inner diameter side. At a position on the outer circumference of the upper part of the stem 11 corresponding to the position, of the stopper 20, a guide groove 11a is formed so as to conform to the ascending/ descending direction and stoke of the stem 11. With engagement of these stopper 20 and guide groove 11a, the rotation of the stem 11 is locked when the stem 11 ascends and descends, which will be described further below.

A lower end position of the guide groove 11a on the outer circumference of the stem 11, an engagement groove 11b is formed so as to round in a circumferential direction. In the engagement groove 11b, an inner-diameter portion of the piston 12 fits, thereby allowing the piston 12 to ascend and descend integrally with the stem 11. With this structure, when the spring-back force of the spring 25 acts from the upper surface side to cause a descending force to act on the piston 12, the descending force acts also on on the stem 11 to allow the stem 11 to descend. Also, the inner circumference of an insertion hole provided at a substantially center position of a lower end face of the bonnet 5 is a portion where a part of the stem 11 is inserted to ascend and descend. This portion is provided with an appropriate bearing 21 to allow ascent and decent of the stem 11 to be guided. In the stem 11 of the example, a portion by a length of a valve stroke is guided by the bearing 21 downward from the position of the engagement groove 11b.

The valve body 2 has a sheath thermocouple and a bottom-closed cylinder 23 having a substantially cylindrical shape. In FIG. 1, the upper end of the cylinder 23 is formed to open annularly, and the lower end of the bellows 31 is concentrically bonded by welding along this upper end. On a lower end face of the cylinder 23, an attachment surface 23a is provided to recessed in a substantially circular shape. To this attachment surface 23a, the ring-shaped seal member 4 (resin-made O ring) is attached with a fixing member 24 (disk washer). The fixing member 24 is fixed in a bolt hole provided to protrude at a substantially center of the attachment surface 23a with a bolt 26 (small countersunk head screw) so as to be concentric with the cylinder 23. In FIG. 1, a space where the seal member 4 is attached is formed between an outer diameter part of the fixing member 24 and an inner diameter part of the attachment surface 23a, and this space is provided so as to have a cross section in a substantially inverted trapezoidal shape (dovetail shape).

The sheath thermocouple is provided with a temperature measuring part 22 (temperature-measurement contact position) and a sheath part 16 in the valve. The temperature measuring part 22 of the example is provided to be fixed to a back surface part of the valve body 2. The temperature measuring part 22 of the example is fixed to the inner bottom of the cylinder 23 by using a disc-shaped fitting 29. In FIG. 1, when these temperature measuring part 22 and fitting 29 are attached to the lower end face of the stem 11, with a disc spring 28 interposed between these and the lower end face of the stem 11, a substantially-disc-shaped base member 27 (heater base) provided with a bolt hole and a protruding part at a center position is inserted into a bolt hole of the lower end face of the stem 11, and is superposed on the temperature measuring part 22 and the fitting 29. Then, the hexagon-socket bolt 18 is tightened into the base member 27 for attachment. Thus, the temperature measuring part 22 and the fitting 29 are tightly attached and fixed between the lower end face of the stem 11 and the base member 27. A lower surface side of the base member 27 is adhered to an adhesion part 23b at the bottom of the cylinder 23 formed in a substantially circular shape. This structure allows the base member 27 and the cylinder 23 to also ascend and descend integrally with ascent and descent of the stem 11, and the open/close, operation of the valve body 2 is performed, as will be described further below. The temperature measuring part of the sheath thermocouple can be arranged as appropriate at a position near the valve body, which is not limited to the above-described position.

The sheath part 16 of the sheath thermocouple is formed by bundling two lead wires connected to the temperature measuring part 22 into one helical wire bundle, is concentrically wired around the outer circumference of the stem 11 in a space inside the bellows 31, and is elastically provided with ascent and descent of the stem 11, which will be described further below. For this helical, wire, any number of helical turns, diameter, structure of the wire bundle, and others can be selected as appropriate in accordance with implementation. However, to avoid a contact of the wire with another member when the wire expands and contracts, it is suitable that the wire is at least ensured to have a diameter smaller than the inner diameter of the bellows 31, which will be described further below, and larger than the outer diameter of a cylindrical part 34a of the tubular member 34. Also, since wiring is carried out just on the outer circumference of the cylindrical part 34a as a heating source, it is suitable to select a sheath material and the number of turns which allow the coil shape to be appropriately kept even with a large number of expansions and contractions during exposure to high temperatures for a long period of times.

In the bellows 31, an upper end of the helical sheath part 16 as depicted in FIG. 1 is drawn out via the space ensured by the pipe flange 15 on an upper surface side of the valve box 9 to the outside of the valve. The pipe flange 15 is provided with a cable holder 45 for fixing the sheath part 16 so that the sheath part 16 is not disturbed by expansion and contraction inside the bellows 31 or the like and also for stable guiding the sheath part 16 to the outside of the valve, thereby fixing the sheath part 16 partway.

The bellows 31 is a metal made seal member having, a substantially cylindrical shape and being elastic in the axial direction, and has bellows flange portions at upper and lower ends in FIG. 1. The lower end of the bellows 31 is bonded to the upper end of the cylinder 23, and the flange portion at the upper end is fixed to the upper part of the valve chamber 10. This flange portion at the upper end is tightly attached and fixed by tightening the bolt 13 between lower ends of the heat insulator 14 and the pipe flange 15 and an upper surface side of the valve box 9. Furthermore, between the flange portion and the upper surface side of the valve box 9, an O ring 32 is tightly attached and fixed as a seal member. Inside the valve chamber 10, the inside of the bellows 31 covers the outer circumference of the lower part of the stem 11 and hermetically seals it from the outside in contact with the fluid.

Figure 2:
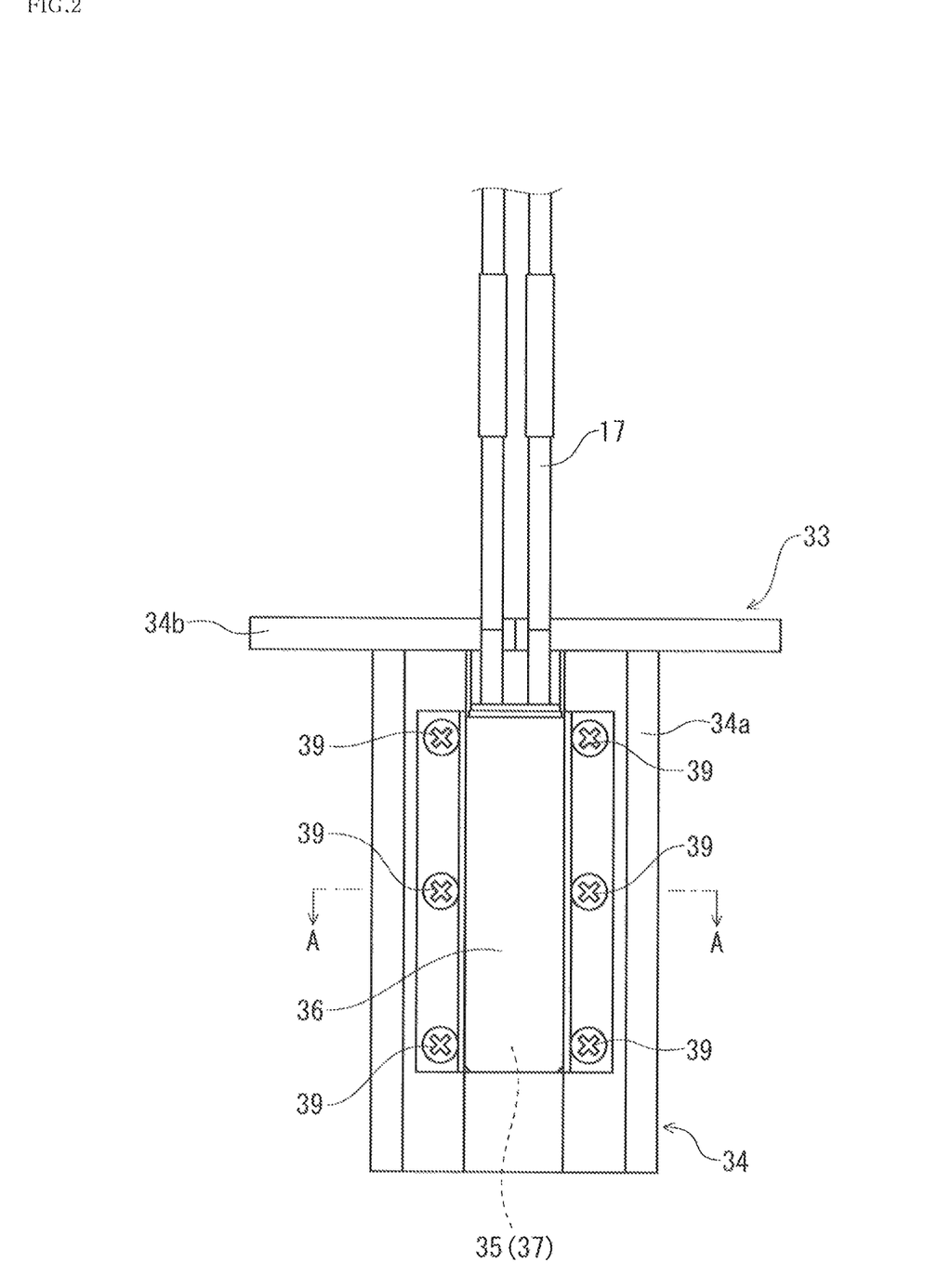
FIG. 2 is a front view of a ceramic heater of the example viewed from a heating element side.
Figure 3:
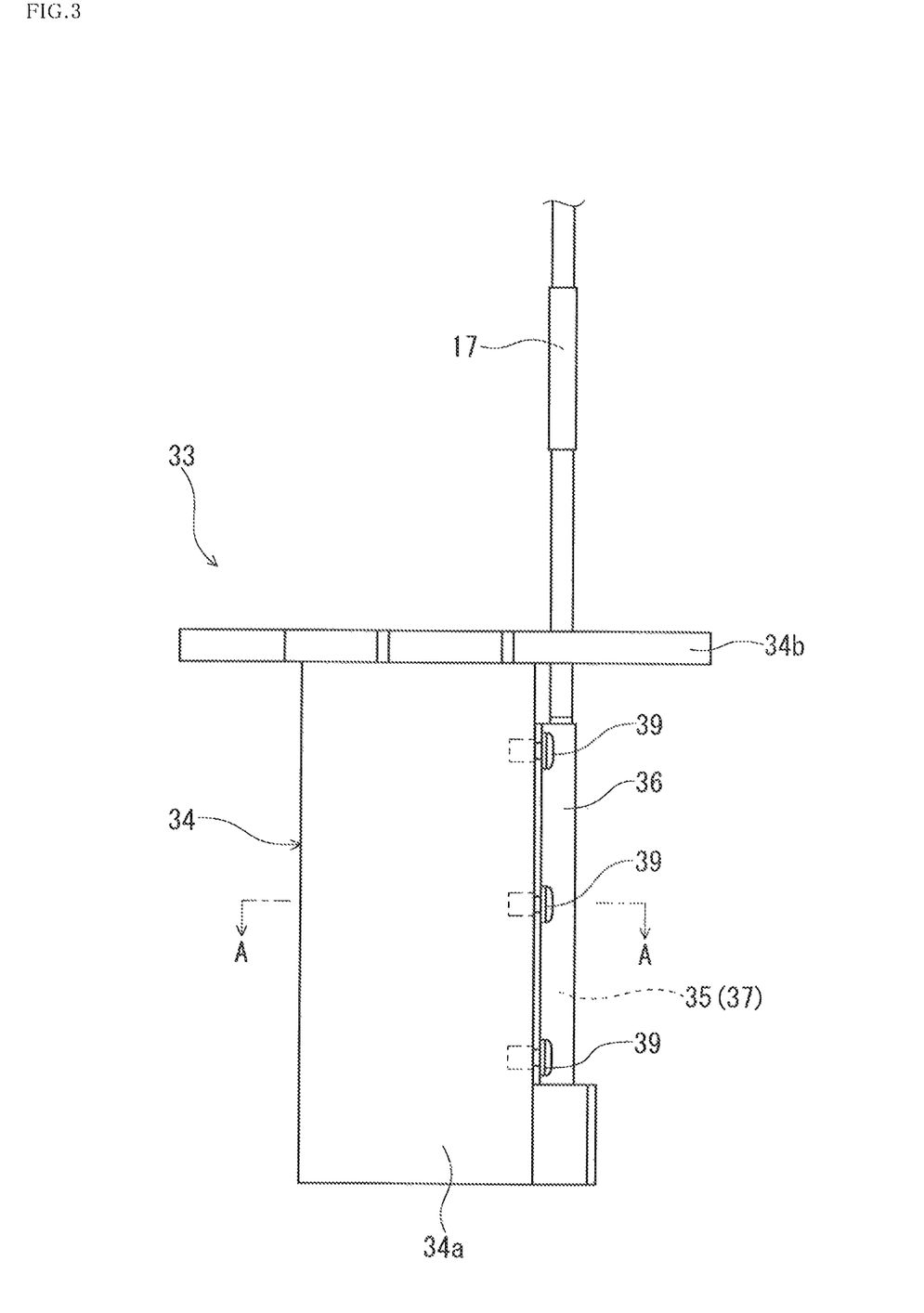
FIG. 3 is a side view of FIG. 2.
Figure 4:
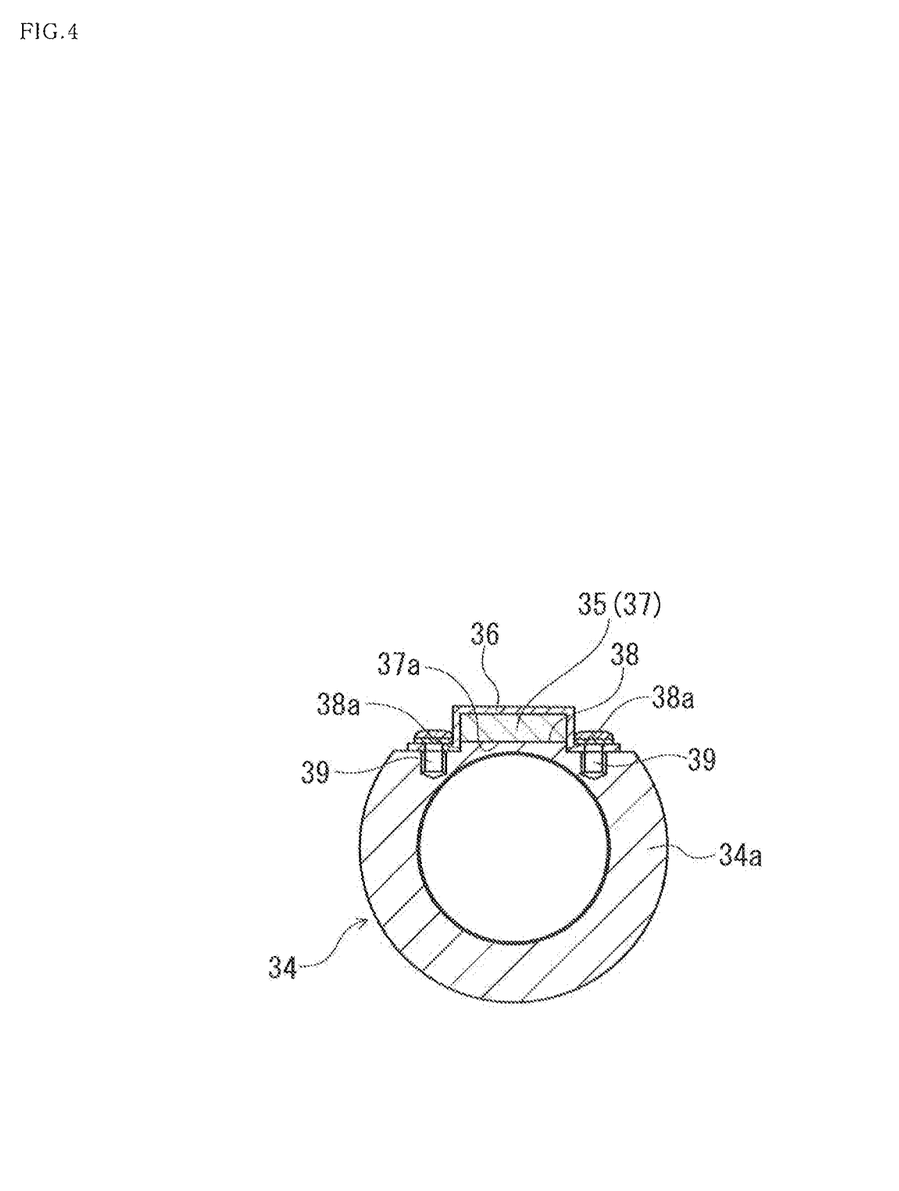
FIG. 4 is a cross-sectional view along an A-A line in FIG. 2 and FIG. 3.

Next, a ceramic heater 33 of the example is described. FIG. 2 is a side view of the ceramic heater 33 from a side where a heating element 37 is provided. FIG. 3 is a left side view of FIG. 2. FIG. 4 is a cross-sectional view along an A-A line in FIG. 2 and FIG. 3.

As depicted in FIG. 1 to FIG. 4, the ceramic heater 33 has the tubular member 34 formed of the cylindrical part 34a having, a substantially cylindrical shape and a flange part 34b provided at one end of the cylindrical part 34a, and a ceramic heater material 35 depicted in FIG. 2 to FIG. 4. The tubular member 34 is integrally formed of a metal with high thermal conductivity. As the metal, for example, any metal such as aluminum (such as A1060, A1070, or A6063), a copper alloy (oxygen-free copper (such as C1020), beryllium copper (such as C1720), or C3604) or SUS is selected as appropriate in accordance with implementation. In the example, one made of aluminum is used. The tubular member 34 may be integrally formed of a single member, or may be made by bonding a plurality of different members by welding or the like. The tubular member 34 can be configured without particular limitation as long as required functions (such as size, shape, thermal conductivity) can be ensured.

As depicted in FIG. 1, the entire tubular member 34 is arranged inside the bellows 31 hermetically sealed against the fluid, and is immovably fixed to the valve box 9. In the example, as described above, with the flange part 34b adhered to the bottom plate part 15a with a bolt, the tubular member 34 is not influenced by the operation even if the valve body 2 ascends and descends, and is fixed as being firmly positioned with respect to the valve box 9. Also, the inner diameter of the cylindrical part 34a is provided to be slightly larger than the outer diameter of the stem 11, and the stem 11 having a substantially circular cross section is loosely and concentrically inserted into the inner diameter side of a cylindrical part 34a having a substantially circular cross section, thereby allowing the stem 11 to ascend and descend.

In FIG. 2 to FIG. 4, the ceramic heater material 35 is configured so that voltage can be applied by paired electrodes not depicted to the ceramic-made heating element 37 having a substantially flattened rectangular parallelepiped shape. This heating element 37 is a resistive heating element which causes heating by energization, and is made of a nonmetallic material that can be used at high temperatures, with a maximum use temperature equal to or higher than 300 degrees Celsius. As this material, in view of heating characteristics and so forth, for example, aluminum nitride (AlN) is suitable. Other than this, a heating element formed of silicon carbide or silicon nitride or, furthermore, zirconia, alumina, or graphite may be used. As depicted in FIG. 2 to FIG. 4, two heater electric wires 17 of the example are provided with nickel wires each sheathed in a polyimide tube, and are connected to electrodes not depicted inside the tubular member 34. To these electrodes, a voltage is applied to cause electrical resistance inside the heating element 37, thereby allowing the heating element 37 to be heated.

In FIG. 2 to FIG. 4, on an outer circumferential surface of the tubular member 34, a flat attachment part 38 having a substantially flat surface is contiguously formed on part of the outer circumferential surface toward a direction (vertical direction on paper in FIG. 3 and lateral direction in FIG. 4) substantially parallel to the axial direction. As depicted in FIG. 4 where the cylindrical part 34a is cross-sectionally viewed, parts of the flat attachment part 38 are provided with step parts 38a at symmetrical positions along the axial direction.

As depicted in FIG. 2 to FIG. 4, to this flat attachment part 38, an attachment plate 36 (attachment member) having a channel-shaped cross section integrally formed of aluminum is fixed with six screws 39 (small countersunk head screws) arranged at symmetrical positions, thereby bringing a substantially entire surface of one side surface 37a of the heating element 37 into close contact with the surface (flat attachment part 38) of the tubular member 34. As depicted in FIG. 4, the width across flats of the side surfaces of the attachment plate 36 conforms to the width of the heating element 37 and the widths of the step parts 38a, and the attachment plate 36 is provided so as to have substantially the same cross sectional shape as that of the heating element 37. Therefore, when the heating element 37 is interposed between the attachment plate 36 and the flat attachment part 38 and the screws 39 are tightened, the heating element 37 can be interposed between the attachment plate 36 and the flat attachment part 38 almost without a gap. Also, almost the entire side surface 37a can be brought into pressure contact with the flat attachment part 38 substantially uniformly. As with the tubular member 34, this attachment plate 36 is also integrally formed of a metal with high thermal conductivity.

Although not depicted, any position and shape of the flat attachment part 38 formed on the surface of the tubular member 34 can be selected as appropriate in accordance with the shape and material of the tubular member 34 as well as the shape and material of the heating element 37, the valve's use conditions, or the like. For example, in FIG. 4, the cross section of the cylindrical part 34a is thick and circular. Thus, by adjusting the depth to the flat attachment part 38 formed by notching a part of the surface of the cylindrical part 34a, the area and shape of the flat attachment part 38 can be adjusted. Also, flat attachment parts 38 may be formed at a plurality of locations at symmetrical positions to bring a plurality of ceramic heater materials into close contact with one another to configure a ceramic heater.

Also, although not depicted, the heating element 37 may have a shape other than a substantially rectangular parallelepiped shape, and the tubular member 34 may be brought into close contact in a mode other than the mode of being adhered to the flat attachment part 38. For example, the flat attachment part may not be provided on the surface of the cylindrical part. Instead, it may be configured such that while the entire surface of the cylindrical part forms a successive substantially columnar shape and has a thin thickness, a heating element is configured to have a curved surface conforming to the shape of this surface to be brought into close contact with the surface so as to be able to be heated. In any case, it is suitable to provide a contact area between the heating element and the tubular member as large as possible to ensure high thermal conductivity.

Furthermore, while the tubular member 34 of the example is configured with the heating element 37 (ceramic heater material 35) partially provided as described above, the entire tubular member may be configured as a heating element. For example, a ceramic-made heating element may be provided in a manner similar to that of the tubular member 34 having the flange part 34b and the cylindrical part 34a as depicted in FIG. 2 to FIG. 4 so that electrical resistance can be applied and this may be used as a ceramic heater. When the tubular member entirely made of ceramic is fixed inside the valve box so as not to be movable, as described above, if a bolt is inserted as it is into the flange part and tightened, breakage may occur because ceramic has weak strength. Thus, appropriate reinforcement may be provided. For example, a washer or the like is used for the bolt, an insert nut may be buried in the ceramic-made flange part, or the only the flange part may be made of metal.

Provided outside the valve box 9 are an external heating member 40, a temperature measuring part 41 of an external thermocouple for detecting a temperature outside the valve (near the outer circumferential surface of the valve box 9), a thermostat 42, and so forth. As the external heating member 40, any heater of various modes can be used without particular limitation in accordance with use. For example, a rubber heater, any of various ceramic heaters such as a PTC heater, or a mantle heater that can cover in a jacket shape can be used.

As depicted in FIG. 1, the external heating member 40 of the example uses a plurality of flexible sheet-shaped or linear rubber heaters formed to have any of various shapes in accordance with the shape of the outer surface of the valve main body 1 (the valve box 9, the inflow port 7, and the outflow port 8) serving as an attachment surface, thereby enhancing the coverage ratio of the heater with respect to the surface area of the outer surface of the valve main body 1 as much as possible. In this manner, with the heater shape divided/modified as appropriate in accordance with the outer shape of the valve main body 1, coverage is made as uniformly as possible. Thus, nonuniformity in heat transfer from internal and external heating members to the valve main body 1 becomes hard to occur, and the occurrence of byproducts can be effectively prevented. In particular, since heating and temperature management near the valve seat 3 at the bottom of the valve box 9 are important, the external heating member 40 is finely divided and attached near the outer surface on the bottom side of the valve box 9 serving as an outer surface near the valve seat 3 to enhance a coverage ratio, and the temperature measuring part 41 implemented by an external thermocouple is provided to allow temperature management with high accuracy.

Next, operation from full-open to full-close of the valve of the example is described. Depicted on the right side of the one-dot-chain line in FIG. 1 is the full-close state of the valve. In this full-close state, no air pressure is applied to the inside of an air chamber not depicted inside the actuator 6, and thus no ascending force acts on the stem 11. The piston 12 inside the bonnet 5 receives the spring-back force of the spring 25 to descend to bottom dead center and, with the spring-back force of the spring and the weight of the valve body 2 and so forth, the seal member 4 of the valve body 2 is brought into pressure contact with the valve seat 3, thereby closing the outflow port 8. In this state, the accordion bellows 31 and the helical sheath part 16 are in a state of being extended most.

In this full-close state, when compressed air is supplied from an air supply source not depicted outside the valve via a coupling 44 to the air chamber inside the actuator 6, a piston of the actuator 6 is caused to ascend. With this ascent the stein 11 to starts ascending so as to exceed the spring-back force of the spring 25 received at the piston 12. With this ascent, the base member 27 and the cylinder 23 fixed to the lower end of the stem 11 integrally ascend, thereby causing the valve body 2 to start ascending. This causes the seal member 4 to go away from the valve seat 3.

With the ascent of the valve body 2, the bellows is also contracted, and thus the sheath part 16 can also be contracted, with its helical shape being kept. Since the piston 12 ascends, the spring 25 is compressed. Also, with this ascent of the stem 11, a partial portion of the stein 11 is approximately not axially shifted with respect to the tubular member 34, the valve body 2, and the bellows 31 because of the bearing 21, and smooth sliding can be made while the stem 11 is aligned with high accuracy. Furthermore, as described above, the inner circumferential surface of the cylindrical part 34a or the flange part 34b of the tubular member 34 and the outer circumferential surface of the stein 11 loosely fit to each other, and an appropriate gap not depicted is ensured. Thus, even if this gap is very small, no contact or rubbing occurs between the outer circumferential surface of the stem 11 and the tubular member 34 with the ascent/descent of the stem 11.

At the upper part of the stem 11, the stopper 20 is constantly engaged with the guide groove 11a irrespective of the ascending/descending motion of the stem 11. Thus, even if any rotating force acts on the stem 11, the stem 11 can be prevented from rotating. In the example, a locking part not depicted inside the actuator 6 is taken as top dead center. Thus, the ascent of the stem 11 causes the piston 12 to be locked at the locking part, thereby causing a valve's full-open state. In this manner, the valve of the example operates from a full-close state to a full-open state. To operate from a full-open state to a full-close state, the valve performs operation in reverse to the above. When the pressure of compressed air in the actuator 6 is reduced, the stem 11 (valve body 2) descends by the action of its self weight and the spring-back force of the spring 25.

Next, the valve heating operation by the ceramic heater 33 (inner heating member) and the external heating member 40 of the example is described. Heat transfer refers to a heat transfer phenomenon and, in accordance with a heat transfer mode, refers to either heat conduction in which its heat-transfer medium is a solid or non-flowing fluid, radiation with heat transfer by electromagnetic waves, or convention in which its heat-transfer medium is a flowing fluid.

With a current supplied from an external power supply not depicted through the heater electric wires 17 to the heating element 37 (tubular member 34), the ceramic heater 33 generates resistive heat. Heat conduction occurs from the surface of the heating, element 37 toward a member in contact with this surface. As depicted in FIG. 4, the heating element 37 has the side surface 37a entirely and substantially uniformly adhered to the flat attachment part 38, and has an approximately entire side surface except both end faces adhered to the attachment plate 36 provided as being made of a material with high thermal conductivity (aluminum) as with the tubular member 34. Thus, thermal conduction that can occur from the surface of the heating element 37 can be efficiently transferred to the tubular member 34.

In the example, the tubular member 34 is made of aluminum and integrally formed. Thus, as depicted in FIG. 2 to FIG. 4, even if only one heating element 37 is provided to only one side of the tubular member 34, the temperature of the cylindrical part 34a and the flange part 34b (the entire tubular member 34) can be quickly and uniformly increased. In fact, it has been demonstrated that heating can be made at sufficient temperatures, quickness, and uniformity under many use conditions of the vacuum bellows hot valve. By selecting structures such as materials and shapes as appropriate as described above, required heating characteristics such as quickness and uniformity of heating of the tubular member 34 can be achieved.

The cylindrical part 34a of the tubular member 34 is vertically provided so that a gap between the cylindrical part 34a and the outer circumference of the stem 11 and a gap between the cylindrical part 34a and the inner circumferential side of the bellows 31 are each provided. Thus, the tubular member 34, the heating element 37, and the attachment plate 36 in a heated state each cause heat transfer by radiation from its outer surface. Also, since the flange part 34b has one side surface fixed, heat transfer occurs to a member in contact, such as the pipe flange 15. This heat transfer allows the member near the tubular member 34 to, be heated via heat transfer.

While the tubular member 34 is configured so as to be axially symmetric, at least the stem 11 and the bellows 31 of the valve main body 1 are also configured so as to be axially symmetric. The tubular member 34 is provided so as to be substantially concentric with the stem 11 and the bellows 31. Thus, thermal transfer from the above-described tubular member 34 to the stem 11 and the bellows 31 or to an upper part (such as the pipe flange 15) of the valve main body 1 can be also caused in a substantially uniform (substantially concentric) manner. In particular, uniformity in heating the stem 11 and the bellows 31 can be enhanced, and heat conduction can be caused quickly in a substantially uniform manner from the lower part of the stem 11 most closed to the tubular member 34 and the upper part of the bellows 31 directly toward the valve body 2.

On the other hand, the external heating member 40 is provided near the valve seat 3. The external heating member 40 can heat from outside of the valve main body 1 via heat transfer. This allows the valve main body 1 to be constantly heated from inside and outside substantially uniformly with sufficient heat quantity. In particular, even if the valve body 2 descends by valve closing to be separated from the tubular member 34 (ceramic heater), the sufficient heating state of the valve body 2 can be kept, together with heating by the external heating member 40. If the output from the heating element 37 is increased to supplement heating when the valve body 2 is separated from the tubular member 34 on the fixed side, the ceramic heater 33 may exhibit thermal runaway. By contrast, in the valve of the present invention, as described above, heating can be efficiently and uniformly made by heating means provided inside and outside of the valve. Thus, excellent energy efficiency and favorable usability cost can be achieved.

Furthermore, the internal temperature measuring part 22 is provided at the bottom of the valve body 2, and the external temperature measuring part 41 is also provided at the bottom outside the valve main body 1. Thus, the temperature of the seal member 4 of the valve body 2 and the valve seat 3 can be measured constantly with high accuracy. Thus, while the distance between the tubular member 34 and the valve body 2 and an area of the bellows 31 to be heated are changed with ascent and descent of the stem 11 (valve body 2), at least an area near the seal member 4 and the valve seat 3, which is the most important area, can be controlled with high accuracy so as to be constantly in a heated state at a temperature close to a required preset temperature.

To use the valve of the example, the ceramic heater 33 and the external heating member 40 are electrically heated as appropriate. Also, based on the temperatures measured by the internal temperature measuring part 22 of the valve body 2 and the external temperature measuring part 41, the temperatures inside and outside of the valve can be appropriately controlled. Inside the valve, heating can be made with energization from the heater electric wires 17 leading to a power supply not depicted to the ceramic heater 33. Also, by controlling the power supply with a temperature controller not depicted based on a signal from the internal temperature measuring part 22, the heating temperature of the tubular member 34 can be controlled with high accuracy. Similarly, outside the valve, with energization to the external heating member 40 and power supply control based on a signal from the external temperature measuring part 41, the heating temperature of the external heating member 40 can be appropriately controlled.

In particular, the thermocouple inside the valve body 2 and the thermocouple outside the valve box 9 are close to each other via the bottom of the cylinder 23 and the valve seat 3 at the bottom of the valve box 9. Thus, the temperatures of the area near the seal member 4 and the area near the valve seat 3, which are important in valve sealability, can be each measured with high accuracy. This allows temperature control of these areas with high accuracy. In particular, it is possible to effectively prevent the occurrence of byproducts between the seal member 4 and the valve seat 3, and valve sealability can be thus favorably kept over a long period of time. Also, since temperatures are measured by the thermocouples, high controllability can be exerted over a wide range of temperatures. Thus, by adjusting a heating temperature area, the present invention can be used for various types of evacuation. Furthermore, with the thermostat 42 provided outside the valve box 9, overheating by the external heating member 40 can be prevented.

Furthermore, the present invention is not limited by the description of the embodiment, and can be variously changed in a range not deviating from the gist of the present invention described in claims.

What is claimed is:

1. A vacuum bellows hot valve comprising:
   a valve box having an inflow port and an outflow port;
   a stem is provided inside the valve box so as to freely ascend and descend;
   a valve body provided at a lower end of the stem;
   a bellows elastically provided to the valve body and on an outer circumferential side of the stem;
   a cylindrical ceramic heater arranged between an inner circumference of the bellows and an outer circumference of the stem,
   wherein the ceramic heater is configured by attaching a plate-shaped ceramic heater material on a side surface of a metal tubular member with high thermal conductivity, the metal tubular member having a flange part; and
   a temperature measuring part of a thermocouple for control is arranged at a position adjacent to the valve body.

2. The vacuum bellows hot valve according to claim 1, wherein the temperature measuring part is fixed to a back surface part of the valve body, and a sheath thermocouple connected to the temperature measuring part is helically arranged between an outer circumference of the ceramic heater and an inner circumference of the bellows.

3. The vacuum bellows hot valve according to claim 1, wherein the flange part on the tubular member is fixed inside the valve box to fix the cylindrical ceramic heater to the valve box, and the stem is inserted into the tubular member in a state in which the stem and tubular member loosely fit to each other.

4. The vacuum bellows hot valve according to claim 1, wherein the ceramic heater material is configured to have a ceramic heating element having a substantially flattened rectangular parallelepiped shape to which a voltage can be applied by paired electrodes.

5. The vacuum bellows hot valve according to claim 4, wherein the tubular member is formed of aluminum, a flat attachment part is formed on one side surface of the tubular member, and the ceramic heater material is attached to the flat attachment part.

6. The vacuum bellows hot valve according to claim 5, wherein the ceramic heater material is attached to the flat attachment part by an attachment plate.

7. The vacuum bellows hot valve according to claim 1, wherein the tubular member is formed of aluminum, a flat attachment part is formed on one side surface of the tubular member, and the ceramic heater material is attached to the flat attachment part.

8. The vacuum bellows hot valve according to claim 7, wherein the ceramic heater material is attached to the flat attachment part by an attachment plate.

* * * * *